(12) United States Patent
Nakano

(10) Patent No.: US 7,609,936 B2
(45) Date of Patent: Oct. 27, 2009

(54) CONTENT RECORDING/REPRODUCING APPARATUS AND METHOD, STORAGE MEDIUM AND COMPUTER PROGRAM

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1561 days.

(21) Appl. No.: 10/062,991

(22) Filed: Feb. 1, 2002

(65) Prior Publication Data

US 2002/0120667 A1 Aug. 29, 2002

(30) Foreign Application Priority Data

Feb. 2, 2001 (JP) ............................. 2001-027164

(51) Int. Cl.
*H04N 5/91* (2006.01)
*H04N 7/00* (2006.01)

(52) U.S. Cl. ......................................... 386/46; 386/83
(58) Field of Classification Search .................... 386/1, 386/46, 45, 125, 126, 83
See application file for complete search history.

(56) References Cited

U.S. PATENT DOCUMENTS

| | | | | | |
|---|---|---|---|---|---|
| 5,828,417 | A | * | 10/1998 | Itagaki et al. | 725/58 |
| 6,028,979 | A | * | 2/2000 | Hirayama et al. | 386/95 |
| 7,010,801 | B1 | * | 3/2006 | Jerding et al. | 725/95 |

* cited by examiner

*Primary Examiner*—Thai Tran
*Assistant Examiner*—Nigar Chowdhury
(74) *Attorney, Agent, or Firm*—Finnegan, Henderson, Farabow, Garrett & Dunner, L.L.P.

(57) ABSTRACT

The present invention is intended to present to audience of content a remaining reproducible period of that content limited in recording retention period. If the information recording retention period is restricted for the purpose of copyright protection for example as with broadcast content for example, a relationship between its limit time and the current time can be presented to the audience of the content. Therefore, the audience can know the remaining viewable period up to the limit time or how long it has passed since the passing of the limit time, thereby understanding the status of a system operation for recording time-limited information. In addition, automatically starting the reproduction of content immediately before its time limit for reproduction can prevent the audience from inadvertent failure of viewing.

25 Claims, 10 Drawing Sheets

CONTENT RECORDING/REPRODUCING APPARATUS AND METHOD, STORAGE MEDIUM AND COMPUTER PROGRAM

BACKGROUND OF THE INVENTION

The present invention relates generally to a content recording/reproducing apparatus and method for recording and reproducing content, a storage medium, and a computer program. More particularly, the present invention relates to a content recording/reproducing apparatus, a storage medium, and a computer program which allow general viewers (listeners) to record and reproduce content distributed by broadcasting or other means.

To be more specific, the present invention relates to a content recording/reproducing apparatus and method, a storage medium, and a computer program which record and reproduce content limited in recording retention period or reproducing period for the purpose of copyright protection for example. More particularly, the present invention relates to a content recording/reproducing apparatus, a storage medium, and a computer program which allow users who view content limited in recording retention period or reproduction period to easily understand a mechanism of the time limits of the recording retention period and the reproduction period.

Today, the advances in digital technology allow the storage of AV data composed of audio and video and in immense quantities without deterioration in quality. For example, hard disk drives capable of storing several tens of gigabytes or more are now available at comparatively low prices and recorders based on the hard disk unit are emerging (refer to, "Devices Capable of Recording TV Programs on Hard Disk Drives Are Coming to Market One After Another" and NIKKEI Electronics, No. 727, pp. 41-46, 1998, "HDD-Based Digital Recording Technologies Are At Last Coming into Home" for example).

In the United States for example, in order to eliminate audience inconveniences such as that audiences cannot view desired broadcast programs because of unexpected telephone calls or visitors, commercially available are devices which store received broadcast content on a mass storage device such as a hard disk drive to allow audiences to view the continuation of the content later.

However, unconditional storage of broadcast content by terminal audiences makes it difficult to control unauthorized content duplication activities, resulting in the violation of content copyright holders such as broadcast companies for example. Especially, the duplication and alteration of digital data and content are extremely easy, thereby exposing their copyrights to the risk. Consequently, it is desirable to limit in some way of other the use of broadcast content such as recording and reproduction on the recording/reproducing devices owned by audiences.

For example, limiting the recording retention period or reproducible period of the content stored by audiences to some length of time can prevent them from reusing the stored content without permission of the copyright holder; for example, the recorded content can be viewed within one hour after its broadcast time. The content recording/reproducing device may be adapted not to hold the received content which has passed a predetermined period after its broadcast or reception time (more specifically, the content is deleted from the hard disk drive of this device) or not to reproduce the expired content (more specifically, the content is retrieved from the hard disk drive).

Thus, setting a recording retention period or a reproducible period to content can technologically control the unauthorized use of content. However, if audiences do not understand the mechanism of the limited use of content or do not know the valid remaining retention or reproducible period of content, it may invite misunderstanding of audiences that the recording/reproducing device has failed or make them uncomfortable because the recording/reproducing device rejects the resumption of the reproduction of the content disrupted by an unexpected telephone call or visitor for example.

SUMMARY OF THE INVENTION

It is therefore an object of the present invention to provide a novel content recording/reproducing apparatus, a storage medium, and a computer program which are capable of recording and reproducing content which is limited in its recording retention period or reproduction period for the purpose of protecting content copyright for example.

It is another object of the present invention to provide a novel content recording/reproducing apparatus, a storage medium, and a computer program which allow audiences of content limited in its recording retention period or reproduction period to understand the mechanism of the limitation with ease.

In carrying out the invention and according to a first aspect thereof, there is provided a content recording/reproducing apparatus for controlling the recording and reproducing of content limited in viewable period, including: content recording means for recording content received from the outside; determination means for determining a viewable period of the recorded content; presentation means for presenting information associated with the viewable period of the recorded content; content reproduction means for reproducing the recorded content; and reproduction control means for controlling a reproducing operation of the content reproduction means in accordance with the viewable period of the recorded content.

Preferably, content to be distributed by broadcasting or communication is limited in its viewable period which allows the reproduction of the received and recorded content for the purpose of its copyright protection. Therefore, the above-mentioned reproduction control means disables the above-mentioned content reproduction means to reproduce the content of which viewable period has expired, thereby protect the copyright of the content.

According to the content recording/reproducing apparatus associated with the first aspect of the invention, the presentation means presents the information associated with the viewable period of the recorded content.

Therefore, on the basis of the presented information, the user, namely the audience of that content, can know the valid remaining time of the content viewable period or the elapsed time after the expiration of the content viewable period. Also the user can easily understand the operational status of a system which records time-limited information. Consequently, the above-mentioned novel configuration is free from fear of misleading the audience into a notion that his content recording/reproducing apparatus is malfunctioning or making the audience uncomfortable because of the rejection of the recording/reproducing apparatus to reproduce the recorded content.

The viewable period as used herein is determined on the basis of a recording retention period uniquely allocated to each piece of content. The viewable period is the remaining time until the recording retention period of that content expires, for example. The specific management methods of the remaining time include a method based on the absolute limit time of date and time and a calendar clock and a method based on the relative limit time by use of recording point of time and first reproduction point of time as a starting point of time.

As described, the content recording retention period has a value which is unique to each piece of content. Content distributors may set to each piece of content a recording retention period in accordance with the commercial or cultural value of that content.

For example, the content viewable period may be determined on the basis of a time from a time point at which the distribution of content starts or the reception or recording of content is started by the above-mentioned content recording means to a point of time at which the recording retention period allocated to that content expires. In this case, the content distributor can set the period in which that content can be viewed or used with reference to a point of time at which that content is distributed by that content distributor.

Alternatively, the content viewable period may be determined on the basis of a point of time at which the recording retention period allocated to that content expires from a period of time at which the reproduction of that content is first started by the above-mentioned content reproduction means. In this case, unless the reproduction of content is started, the audience can hold valid the content recording retention period allocated by the content distributor, thereby allowing the audience to view the recorded content from any point of time. Namely, unless the audience clears the paused state, the content can be held in the viewable state.

The above-mentioned presentation means may present the information associated with the viewable period of the recorded content by superimposing the information on a reproduction signal of the content. Consequently, the audience of that content can make confirm the remaining period on the reproduction screen of that content.

Still alternatively, the above-mentioned presentation means may present the information associated with the viewable period of the recorded content through an output device different from a reproduction output device of the content.

Yet alternatively, the above-mentioned presentation means may transmit the information associated with the viewable period of the recorded content to a predetermined communication path, thereby notifying the audience of the remaining period on an external device.

The content recording/reproducing apparatus of the first aspect of the invention, further including control input means for accepting user command input. This control input means is constituted by a control panel or a remote control unit for example, by means of which the audience can give instruction such as content selection, recording, pause, fast feed, and rewinding.

In response to an instruction for moving a content viewing start position through the above-mentioned control input means, the above-mentioned reproduction control means may instruct the content reproduction means to move a content viewing position and the presentation means presents information associated with the viewable period of the reproduced content. Consequently, the user, namely the audience of that content, can know the remaining period in which the content can be reproduced for viewing and the elapsed time from a point of time at which the content viewable time has expired. At the same time, the user can understand a system operational status, namely the time-limited recording of information.

Further, in response to an instruction for clearing a viewing pause operation through the above-mentioned control input means, the above-mentioned presentation means may present the information associated with the viewable period of the content, and if the viewable period of the content has not been passed, the reproduction control means instructs the content reproduction means to start reproducing the content.

The above-mentioned reproduction control means disables the above-mentioned content reproduction means to reproduce the content of which viewable period has expired in order to protect the rights of that content such as copyright, so that the user cannot view that content any further. Consequently, the pausing of viewing need not be continued beyond the viewable period.

Therefore, in response to the expiration of the viewable period of content in a viewing paused state, the above-mentioned reproduction control means may start reproducing the content in the viewing paused state regardless of a user instruction for clearing the viewing paused state, thereby preventing the failure of viewing from happening due to carelessness. In this case, the above-mentioned presentation means may present an elapsed time from the start of the reproduction of the content, thereby notifying the user of the elapsed viewing period.

In carrying out the invention and according to a second aspect thereof, there is provided a content recording/reproducing method for controlling the recording and reproduction of content limited in viewable period, including the steps of: recording content received from the outside; determining a viewable period of the recorded content; presenting information associated with the viewable period of the recorded content; and reproducing the recorded content in accordance with a relationship between a recording retention period of the recorded period and a current time.

According to the content recording/reproducing method associated with the second aspect of the invention, the above-mentioned presentation step presents the viewable period of content on the basis of a recording retention period unique to each content. The viewable period as used herein is determined on the basis of a recording retention period uniquely allocated to each piece of content.

Therefore, on the basis of the presented information in the presentation step, the user, namely the audience of that content, can know the valid remaining time of the content viewable period or the elapsed time after the expiration of the content viewable period. Also the user can easily understand the operational status of a system which records time-limited information.

For example, the content viewable period may be determined on the basis of a time from a time point at which the distribution of content starts or the reception or recording of content is started by the above-mentioned content recording step to a point of time at which the recording retention period allocated to that content expires Alternatively, the content viewable period may be determined on the basis of a point of time at which the recording retention period allocated to that content expires from a period of time at which the reproduction of that content is first started by the above-mentioned content reproduction means.

In the above-mentioned presentation step, the information associated with the viewable period of the recorded content may be presented by superimposing the information on a reproduction signal of the content. Consequently, the audience of that content can make confirm the remaining period on the reproduction screen of that content. Still alternatively, the above-mentioned presentation step may present the information associated with the viewable period of the recorded content through an output device different from a reproduction output device of the content. Yet alternatively, in the above-mentioned presentation step, the information associated with the viewable period of the recorded content may be transmitted to a predetermined communication path such as a network, thereby notifying the audience of the remaining period is notified to the audience on an external device.

The content recording/reproducing method associated with the second aspect of the invention may switch between recorded content reproducing operations in accordance with a command inputted by the user.

For example, in response to an instruction by the user, or the content audience, for moving a viewing start position, a content reproducing position may be moved and, at the same time, the information about the viewable period of the reproduced content may be presented by the above-mentioned presentation step, thereby allowing the user, namely the content audience, to know the remaining period in which the content can be reproduced, or viewed, and the elapsed time from the expiration of the viewable time and easily understand a system operational status, or the recording of time-limited information.

Further, in response to an instruction for clearing a viewing pause operation from the user, in the above-mentioned presentation step, the information associated with the viewable period of the content may be presented, and if the recording retention period of the content has not been passed, the reproduction control step instructs the content reproduction step to start reproducing the content.

In the above-mentioned reproduction control step, reproduction of the content of which recording retention period had expired is disabled in order to protect the rights of that content such as copyright, so that the user cannot view that content any further. Consequently, the pausing of viewing need not be continued beyond the recording retention period. Therefore, in response to the expiration of the viewable period of content in a viewing paused state, in the above-mentioned content reproduction step, reproduction of the content in the viewing paused state may be started regardless of a user instruction for clearing the viewing paused state, thereby preventing the failure of viewing from happening due to carelessness. In this case, in the above-mentioned presentation step, an elapsed time from the start of the reproduction of the content may be presented, thereby the user is notified of the elapsed viewing period.

In carrying out the invention and according to a third aspect thereof, there is provided a storage medium physically storing computer-software in a computer-readable format, the computer software being written so as to execute, on a computer system, control of recording and reproducing operations of content limited in viewable period, the computer software including the steps of: recording content received from the outside; determining a viewable period of the recorded content; presenting information associated with the viewable period of the recorded content; and reproducing the recorded content in accordance with a relationship between a recording retention period of the recorded content and a current time.

The storage medium associated with the third aspect of the invention provides, in computer-readable format, computer software to a general-purpose computer system which can execute various program codes, for example. This storage medium is a detachable and portable storage medium such as CD (Compact Disc), FD (Flexible Disc), or MO (Magneto-Optical disc) for example. Alternatively, it is technologically possible that the computer software may be provided to particular computer systems via transmission media such as a network (regardless of wireless or wired).

The above-mentioned storage medium defines the structural or functional synergistic relationship between computer software and storage medium in order to realize the functionality of predetermined computer software on computer systems. In other words, the installation of predetermined computer software into a computer system via the storage medium associated with the third aspect of the invention exerts the synergistic action on the computer system, thereby obtaining the same effects as those of the content recording/reproducing apparatus and method associated with the first and second aspects of the invention.

In carrying out the invention and according to a fourth aspect thereof, there is provided a computer program written so as to execute, on a computer system, control of recording and reproducing operations of content limited in viewable period, the computer program including the steps of: recording content received from the outside; determining a viewable period of the recorded content; presenting information associated with the viewable period of the recorded content; and reproducing the recorded content in accordance with a relationship between a recording retention period of the recorded content and a current time.

The computer program associated with the fourth aspect of the invention defines, in a computer-readable format, a computer program for realizing predetermined processing on computer systems. In other words, the installation of the computer program associated with the third aspect of the invention into a computer system exerts the synergistic action on the computer system, thereby obtaining the same effects as those of the content recording/reproducing apparatus and method associated with the first and second aspects of the invention.

These and other objects of the invention will be seen by reference to the description, taken in connection with the accompanying drawings.

DETAILED DESCRIPTION OF THE PREFERRED EMBODIMENTS

This invention will be described in further detail by way of example with reference to the accompanying drawings.

Figure 1:
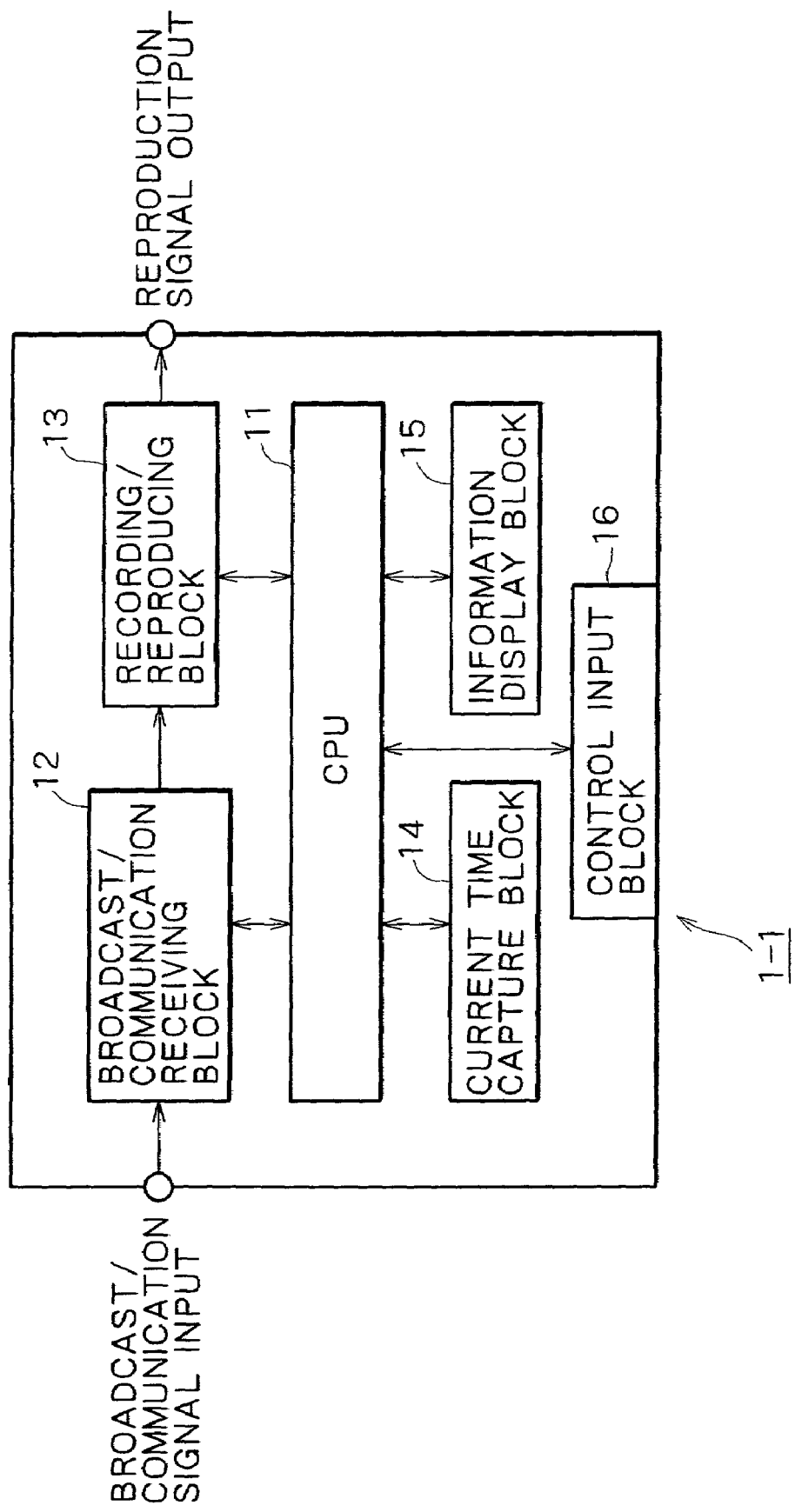
FIG. 1 schematically illustrates a functional configuration of a content recording/reproducing apparatus practiced as one embodiment of the invention.

Now, referring to FIG. 1, there is shown a schematic diagram of a content recording/reproducing apparatus 1-1 associated with a first embodiment of the invention. The content recording/reproducing apparatus 1-1 is capable of storing content of push distribution type such as broadcast content for example, reproducing the stored content at a time different from the distribution time, and providing the reproduced content for user viewing (listening). In the following description, it is assumed that content be always stored in the content recording/reproducing apparatus 1-1, a content read pointer position be determined by activating a viewing pause capability, and a memory read operation be executed from the determined read pointer position by clearing the viewing pause capability.

The content recording/reproducing apparatus 1-1 associated with the present first embodiment is capable of receiving content distributed by use of communication media such as broadcast waves and networks, recording the received content with a time limit in recording retention period or reproducible period, and presenting the relationship between the time limit and the current time. The following describes the functions of the components of the content recording/reproducing apparatus 1-1 with reference to FIG. 1.

A CPU (Central Processing Unit) 11 is a main controller for totally controlling the entire operation of the content recording/reproducing apparatus 1-1 by executing various control programs in an execution environment provided by an operating system (OS).

A broadcast/communication receiving block 12 receives broadcast content through an antenna (or a cable) or receives content distributed from a server through a network (for example, a wide area network such as the Internet). The received content is supplied to a recording/reproducing block 13.

The recording/reproducing block 13 is constituted by a hard disk (not shown) having a storage capacity of several tens of gigabytes or higher for example and a disk interface for controlling such access operations to the hard disk as read and write.

For example, when receiving content in the form of broadcast wave in the content recording/reproducing apparatus 1-1, the broadcast/communication receiving block 12 receives broadcast content of a predetermined channel by executing channel selecting processing as instructed by the CPU 11 to generate an MPEG (Moving Picture Experts Group) data stream. The generated MPEG data are sent to the recording/reproducing block 13 to be stored in its hard disk.

In content reproduction, the recording/reproducing block 13 decodes the MPEG data retrieved from the hard disk for example to generate a video signal and an audio signal. The recording/reproducing block 13 performs predetermined video signal processing on the video signal and outputs the resultant video signal to a display monitor (not shown) The recording/reproducing block 13 performs predetermined audio signal processing on the audio signal and outputs the resultant audio signal to a speaker (not shown).

Obviously, broadcast content need not be always recorded. If the received broadcast wave is outputted as it is for viewing, the content recording processing by the recording/reproducing block 13 may be skipped, decoding the MPEG data stream as they are, the obtained audio and video signals being outputted to the display monitor and speaker.

In the example shown in FIG. 1, the display for visually outputting content and the speaker for audibly outputting content are externally connected to the content recording/reproducing apparatus 1-1. It will be apparent that the content recording/reproducing apparatus 1-1 may incorporate these output devices.

In the present first embodiment, the recording/reproducing block 13 executes content recording and reproducing operations as instructed by the CPU 11. For example, in accordance with a content recording or reproducing command given by the CPU 11, the recording/reproducing block 13 accesses a predetermined area on the hard disk to read or write specified data. If a command for protecting content is given by the CPU 11, the recording/reproducing block 13 deletes the content of which recording retention period has passed from the hard disk or rejects the reading of the content of which reproducible period has passed from the hard disk.

A control input block 16 is a functional module for the user to input commands into the content recording/reproducing apparatus 1-1 and constituted by a control panel or a remote control unit from which user operations are entered. User input commands include a power on/off command for powering on/off the content recording/reproducing apparatus 1-1, or channel selection of the content recording/reproducing apparatus 1-1, content recording, viewing pause, fast forward, rewinding, and pause commands.

A current time capture block 14 is a functional module for supplying a current time to the content recording/reproducing apparatus 1-1 and constituted by a general realtime clock (RTC) capable of counting realtime (or an absolute time for measuring content viewable period).

The CPU 11 receives a current time from the current time capture block 14 to compute a relationship between the recording retention period or the reproducible period and the current time for each piece of content stored in the recording/reproducing block 13.

Further, on the basis of a content viewable period, the CPU 11 executes predetermined operation control in the content recording/reproducing apparatus 1-1.

The viewable period as used herein denotes a period in which recorded content can be reproduced for viewing In the present first embodiment, a content viewable period is determined on the basis of a recording retention period uniquely given to each piece of content. The viewable period is a remaining period until the recording retention period expires for example. The specific management methods of the remaining time include a method based on the absolute limit time of date and time and a calendar clock and a method based on the relative limit time by use of recording point of time and first reproduction point of time as a starting point of time. It should be noted that the content recording retention period has a value which is unique to each piece of content. Content distributors may set to each piece of content a recording retention period in accordance with the commercial or cultural value of that content.

One example of the operation control based on viewable period is control for reproducing recorded content. Another example is the displaying of the information associated with the viewable period of recorded content.

The content reproduction control denotes the content reproduction limitation by the recording/reproducing block 13. To be more specific, the content reproduction control instructs the recording/reproducing block 13 to delete the content of which viewable period has passed from the hard disk or disable the reading of the content of which viewable period has passed from the hard disk. Namely, any content of which viewable period has passed is disabled for its reproduction namely viewing for the purpose of protecting the content-associated rights such as copyright for example.

The presentation of the information associated with the viewable period of recorded content denotes the externally outputting of the information such as a content viewable remaining time for example. The specific management methods of the remaining time include a method on the basis of a time from a time point at which the distribution of content starts or the reception or recording of content is started to a point of time at which the recording retention period allocated to that content passes or on the basis of a point of time at which the recording retention period allocated to that content passes from a period of time at which the reproduction of that content is first started (details to be described later).

In the present first embodiment, computing the viewable remaining time of recorded content, the CPU 11 outputs the computation result to an information display block 15, notifying the audience thereof by means of image or sound. Having been notified, the audience can understand the remaining time up to the viewing limit time of the content or how long it has passed after the limit time. The information display block 15 is an external output device dedicated and connected to the content recording/reproducing apparatus 1-1 and constituted by a liquid crystal display panel and a speaker for example arranged in addition to the reproduced content outputting.

Figure 2:
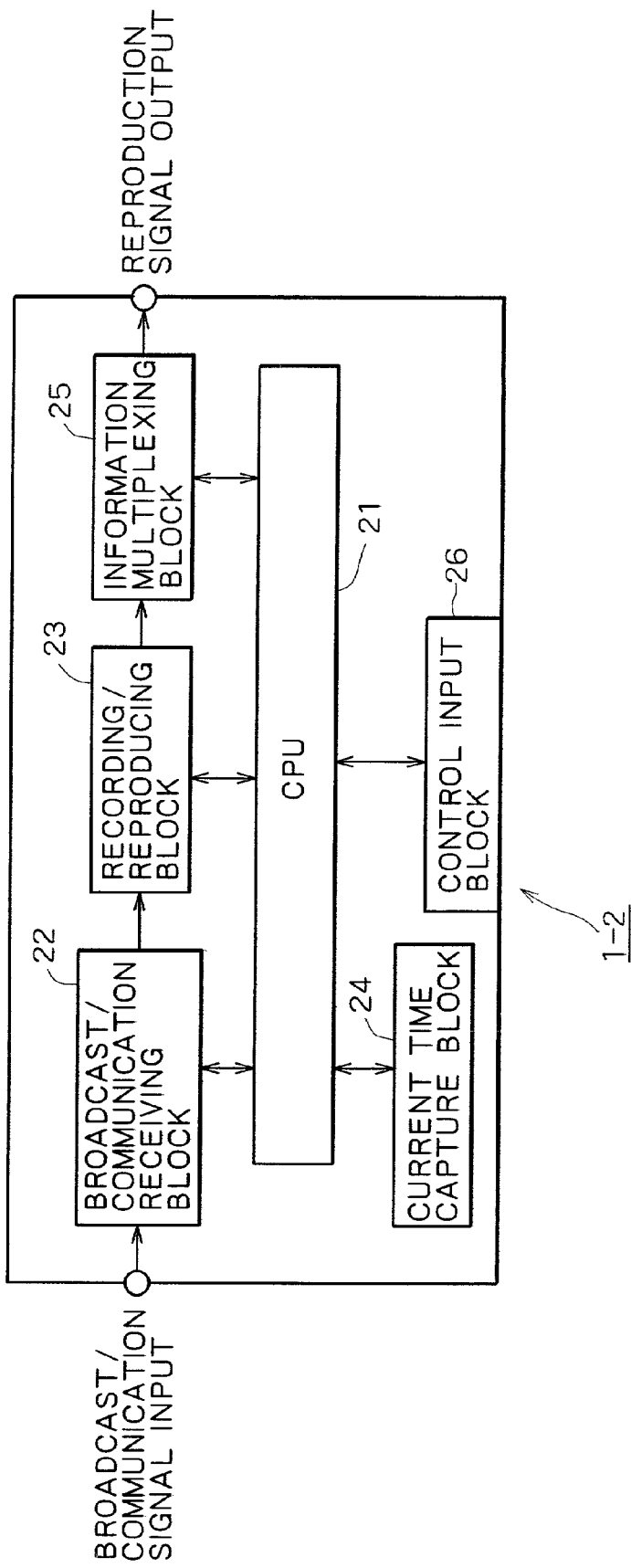
FIG. 2 schematically illustrates a functional configuration of a content recording/reproducing apparatus practiced as another embodiment of the invention.

Referring to FIG. 2, there is shown a schematic diagram of a functional configuration of a content recording/reproducing apparatus 1-2 practiced as a second embodiment of the invention.

In the following description, it is assumed that content be always stored in the content recording/reproducing apparatus 1-2, a content read pointer position be determined by activating a viewing pause capability, and a memory read operation be executed from the determined read pointer position by clearing the viewing pause capability (like the first embodiment).

The content recording/reproducing apparatus 1-2 associated with the present second embodiment is capable of receiving content distributed by use of communication media such as broadcast waves and networks, recording the received content with a time limit in recording retention period or reproducible period, and presenting the relationship between the time limit and the current time. The following describes the functions of the components of the content recording/reproducing apparatus 1-2 with reference to FIG. 2.

A CPU 21 is a main controller for totally controlling the entire operation of the content recording/reproducing apparatus 1-2 by executing various control programs in an execution environment provided by an operating system.

A broadcast/communication receiving block 22 receives broadcast content through an antenna or receives content downloaded through a network. The received content is supplied to a recording/reproducing block 23.

The recording/reproducing block 23 is constituted by a hard disk (not shown) having a large storage capacity and a disk interface for controlling such access operations to the hard disk as read and write.

For example, when receiving content, the broadcast/communication receiving block 22 receives broadcast content of a predetermined channel by executing channel selecting processing as instructed by the CPU 21 to generate an MPEG data stream. The generated MPEG data are sent to the recording/reproducing block 23 to be stored in its hard disk.

In content reproduction, the recording/reproducing block 23 decodes the MPEG data retrieved from the hard disk for example to generate a video signal and an audio signal. The recording/reproducing block 23 performs predetermined video signal processing on the video signal and outputs the resultant video signal to a display monitor (not shown). The recording/reproducing block 23 performs predetermined audio signal processing on the audio signal and outputs the resultant audio signal to a speaker (not shown).

Obviously, broadcast content need not be always recorded. If the received broadcast content is outputted as it is for viewing, the content recording processing by the recording/reproducing block 23 may be skipped, decoding the MPEG data stream as they are, the obtained audio and video signals being outputted to the display monitor and speaker. It will be apparent that the content recording/reproducing apparatus 1-2 may incorporate these output devices.

In the present second embodiment, the recording/reproducing block 23 executes content recording and reproducing operations as instructed by the CPU 21. For example, in accordance with a content recording or reproducing command given by the CPU 21, the recording/reproducing block 23 accesses a predetermined area on the hard disk to read or write specified data. If a command for protecting content is given by the CPU 21, the recording/reproducing block 23 limits the usage of the content of which viewable period has passed. For example, the recording/reproducing block 23 deletes the content of which viewable period has passed from the hard disk (disabling recording retention) or rejects the reading of the content of which viewable period has passed from the hard disk (disabling reproduction).

A control input block 26 is a functional module for the user to input commands into the content recording/reproducing apparatus 1-2 and constituted by a control panel or a remote control unit from which user operations are entered. User input commands include a power on/off command for powering on/off the content recording/reproducing apparatus 1-2, or channel selection of the content recording/reproducing apparatus 1-2, content recording, viewing pause, fast forward, rewinding, and pause commands.

A current time capture block 24 is a functional module for supplying a current time to the content recording/reproducing apparatus 1-2 and constituted by a general realtime clock (RTC) capable of counting realtime.

The CPU 21 receives a current time from the current time capture block 24 to compute a viewable period for each piece of content stored in the recording/reproducing block 23. The content viewable period may be determined on the basis of a time from a time point at which the distribution of content starts or the reception or recording of content is started to a point of time at which the recording retention period allocated to that content passes or on the basis of a point of time at which the recording retention period allocated to that content passes from a period of time at which the reproduction of that content is first started (as described above). Further, on the basis of the viewable period of content, the CPU 21 performs control of a content reproducing operation and the displaying of the information associated with the content viewable period.

Content reproduction control is executed in the same manner as described with the above-mentioned first embodiment, so that its description is omitted.

The above-mentioned presentation of the information associated with the viewable period of content denotes the outputting of a computed viewable period. In the present second embodiment, this function is realized by an information multiplexing block 25. To be more specific, the CPU 21 computes the viewable period of the recorded content and instructs the information multiplexing block 25 to display the information based on the computation result. The information multiplexing block 25 superimposes a video signal and/or an audio signal reproduced on the basis of the data read from the recording/reproducing block 23 with the signal for displaying the information associated with the viewable period. Consequently, the information associated with the viewable period is outputted in image or sound as superimposed on normal content reproduction information. Therefore, the audience can understand a remaining time up to the content viewable limit time or how long it has passed after the passing of the limit time, while viewing the reproduced image of the recorded content.

Figure 3:
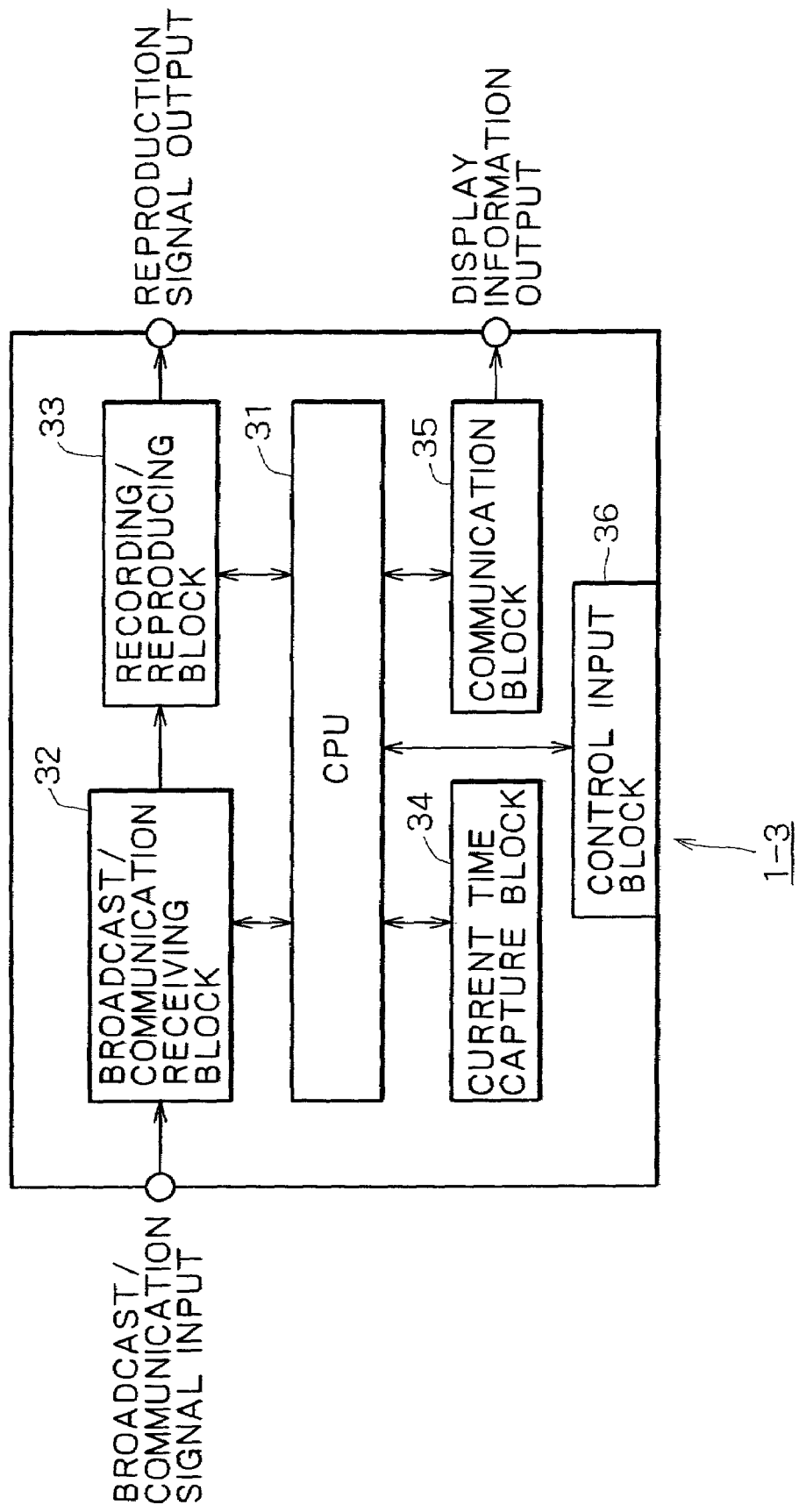
FIG. 3 schematically illustrates a functional configuration of a content recording/reproducing apparatus practiced as a further embodiment of the invention.

Referring to FIG. 3, there is shown a schematic diagram of a functional configuration of a content recording/reproducing apparatus 1-3 practiced as a third embodiment of the invention.

In the following description, it is assumed that content be always stored in the content recording/reproducing apparatus 1-3, a content read pointer position be determined by activating a viewing pause capability, and a memory read operation be executed from the determined read pointer position by clearing the viewing pause capability (like the first and second embodiments).

The content recording/reproducing apparatus 1-3 is capable of receiving content distributed by use of communication media such as broadcast waves and networks, recording the received content with a time limit in viewable period, and presenting the relationship between the time limit and the current time. The following describes the functions of the components of the content recording/reproducing apparatus 1-3 with reference to FIG. 3.

A CPU 31 is a main controller for totally controlling the entire operation of the content recording/reproducing apparatus 1-3 by executing various control programs in an execution environment provided by an operating system.

A broadcast/communication receiving block 32 receives broadcast content through an antenna or receives content downloaded through a network. The received content is supplied to a recording/reproducing block 33.

The recording/reproducing block 33 is constituted by a hard disk (not shown) having a large storage capacity and a disk interface for controlling such access operations to the hard disk as read and write.

The broadcast/communication receiving block 32 receives broadcast content of a predetermined channel by executing channel selecting processing as instructed by the CPU 31 to generate an MPEG data stream. The generated MPEG data are sent to the recording/reproducing block 33 to be stored in its hard disk.

In content reproduction, the recording/reproducing block 33 decodes the MPEG data retrieved from the hard disk for example to generate a video signal and an audio signal. The recording/reproducing block 33 performs predetermined video signal processing on the video signal and outputs the resultant video signal to a display monitor (not shown). The recording/reproducing block 33 performs predetermined audio signal processing on the audio signal and outputs the resultant audio signal to a speaker (not shown).

Obviously, broadcast content need not be always recorded. If the received broadcast content is outputted as it is for viewing, the content recording processing by the recording/reproducing block 33 may be skipped, decoding the MPEG data stream as they are, the obtained audio and video signals being outputted to the display monitor and speaker. It will be apparent that the content recording/reproducing apparatus 1-3 may incorporate these output devices.

In the present third embodiment, the recording/reproducing block 23 records and reproduces content as instructed by the CPU 31. For example, in accordance with a content recording or reproducing command given by the CPU 31, the recording/reproducing block 33 accesses a predetermined area on the hard disk to read or write specified data. If a command for protecting content is given by the CPU 31, the recording/reproducing block 33 limits the usage of the content of which viewable period has passed. For example, the recording/reproducing block 33 deletes the content of which viewable period has passed from the hard disk (disabling recording retention) or rejects the reading of the content of which viewable period has passed from the hard disk (disabling reproduction).

A control input block 36 is a functional module for the user to input commands into the content recording/reproducing apparatus 1-3 and constituted by a control panel or a remote control unit from which user operations are entered. User input commands include a power on/off command for powering on/off the content recording/reproducing apparatus 1-3, or channel selection of the content recording/reproducing apparatus 1-3, content recording, viewing pause, fast forward, rewinding, and pause commands.

A current time capture block 34 is a functional module for supplying a current time to the content recording/reproducing apparatus 1-3 and constituted by a general realtime clock (RTC) capable of counting realtime.

The CPU 31 receives a current time from the current time capture block 34 to compute a viewable period for each piece of content stored in the recording/reproducing block 33. The content viewable period may be determined on the basis of a time from a time point at which the distribution of content starts or the reception or recording of content is started to a point of time at which the recording retention period allocated to that content passes or on the basis of a point of time at which the recording retention period allocated to that content passes from a period of time at which the reproduction of that content is first started (as described above). Further, on the basis of the viewable period of content, the CPU 31 performs control of a content reproducing operation and the displaying of the information associated with the content viewable period.

Content reproduction control is executed in the same manner as described with the above-mentioned first embodiment, so that its description is omitted.

The above-mentioned presentation of the information associated with the viewable period of content denotes the outputting of a computed viewable period. In the present third embodiment, this function is realized by a communication block 35. To be more specific, the CPU 31 computes a viewable period of the recorded content and sends the information based on the computation result to an external device via the communication block 35. The communication block 35 connects to the external device via a connection port based on such interface as USB (Universal Serial Bus) or IEEE 1394 for example, via a short-distance data communication capability such as Bluetooth or IrDA (Infrared Data Association) for example, or via a network interface such as Ethernet (trademark) for example The external device as used herein (not shown) has a capability of externally outputting data in the form of image or sound, externally outputting the information associated with the viewable period of content received through the communication block 35 for presentation to the audience. Therefore, the audience can understand a remaining time up to the content viewable limit time or how long it has passed after the passing of the limit time, while viewing the reproduced image of the recorded content.

Now, a situation is considered in which the user who views broadcast content via the content recording/reproducing apparatus 1 (1-1 through 1-3) associated with each of the above-mentioned embodiments must discontinue the viewing due to unexpected telephone call or visitor for example.

In the following description, it is assumed that the content recording/reproducing apparatus 1 always record received broadcast/communication content and first reproduce it immediately, therefore outputting the reproduction in the form of image and sound.

If temporarily disrupted of the viewing of the received content, the user inputs a pause command for example through the control input block 16/26/36. Obviously, without always recording received content, the content recording/reproducing apparatus 1 may be adapted to start recording received content at the inputting of a pause command by use of this inputting as a trigger for the starting.

Detecting that the user cannot continue the viewing, the CPU 11/21/31 stores the reproduction point at that moment. Then, upon reception of a pause clear command for restarting the viewing from the user through the control input block 16/26/36, the CPU 11/21/31 instructs the recording/reproducing block 13/23/33 to start reproduction from the position at which the viewing was discontinued.

In addition, on the basis of the information in a received broadcast/communication signal, the CPU 11/12/13 checks whether the viewable period of the received broadcast/communication content is limited or not. If the viewable period is found limited, when recording that content to the recording/reproducing block 13/23/33, the CPU records, along with the above-mentioned signal, the information for obtaining a recording time at which the recording was made at a position on a recording medium. For example, a method is used in which a time code initialized by the current time of recording starting is recorded. Alternatively, a method is used in which a time code initialized by the current time for first reproducing the content recorded in the recording/reproducing block 13/23/33 is recorded. The information about recording start time and reproduction start time is used for the computation of the viewable period of the recorded content.

When the user namely the audience pauses the viewing of content, then the CPU computes the remaining time of content viewable period from the relationship between recorded time and current time. By outputting the computed remaining time, the CPU notifies the user of that the recording of that content is time-limited and of the remaining viewable time. Consequently, the user can understand a remaining time up to the content viewable limit time or how long it has passed after the passing of the limit time, while viewing the reproduced content. It should be noted that a method of externally outputting a content viewable remaining time depends on each of the above-mentioned embodiments as described above.

The following describes a processing procedure for realizing broadcast/communication content recording and reproducing operations and a recording retention remaining time displaying operation by the content recording/reproducing apparatus 1 associated with each of the above-mentioned embodiments.

Figure 4:
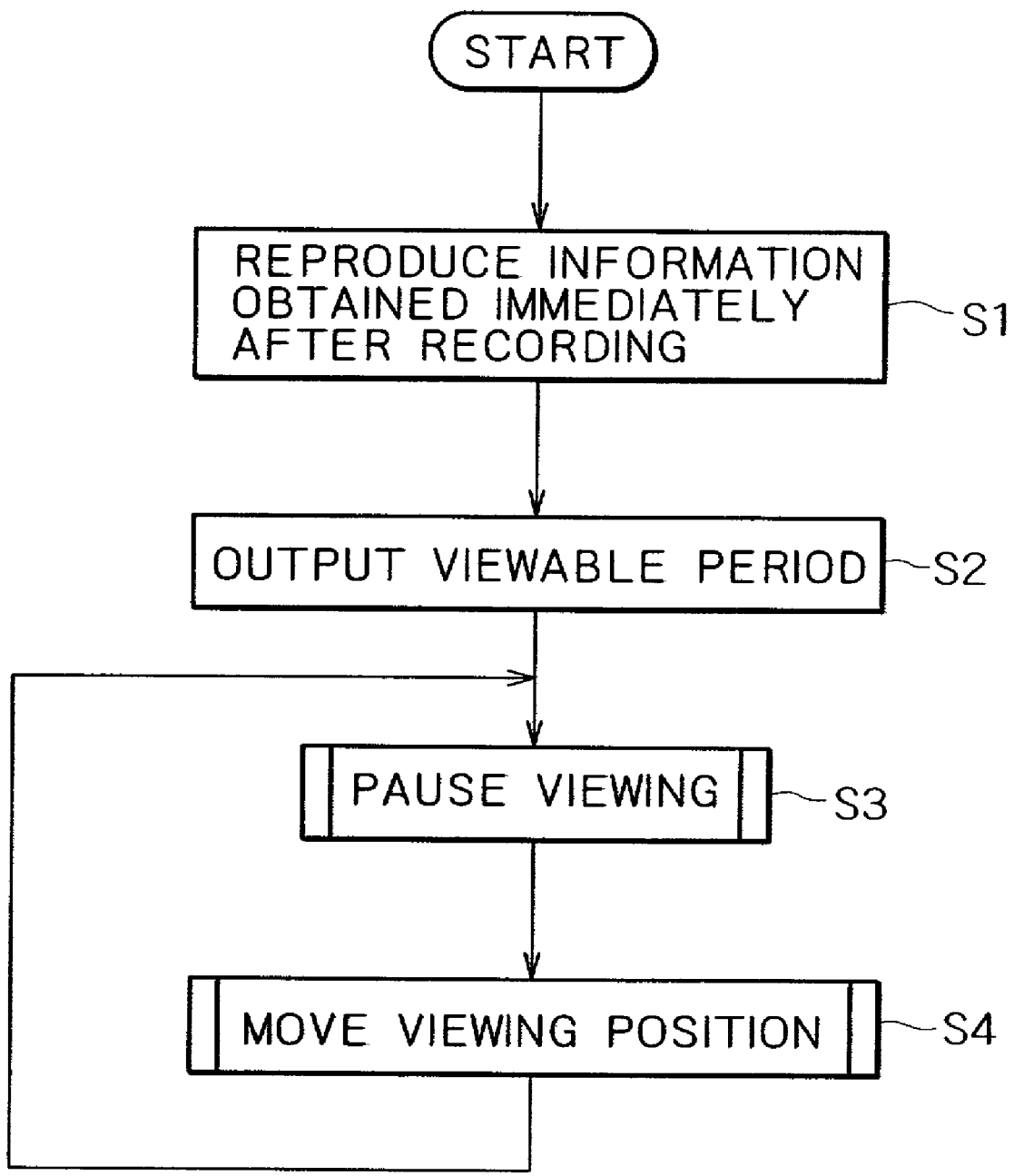
FIG. 4 is a flowchart describing a processing procedure of realizing content recording and reproducing operations in the content recording/reproducing apparatus of FIG. 1 to 3.

Referring to FIG. 4, there is shown a flowchart describing an outline processing for realizing the content recording and reproducing operations in the content recording/reproducing apparatus 1. Actually, this processing is executed in the form in which the CPU 11/21/31 executes predetermined program codes. In what follows, the content recording and reproducing operations will be described with reference to this flowchart.

In the content recording/reproducing apparatus 1, broadcast content of a channel selected by the broadcast/communication receiving block 12/22/32 is received to be recorded by the recording/reproducing block 13/23/33 and, at the same time, the reproduced content is immediately outputted in image and sound (step S1).

While this content reproduction is being executed, the CPU 11/21/31 captures the current time and computes the relationship between the viewable period for the content being reproduced and the captured current time, thereby outputting the content to the audience in the viewable period (step S2). The method of computing the relationship between the viewable period and the current time is as described before.

In the above-mentioned first embodiment, the content is outputted to the audience by the dedicated information display block 15 in the form of image and/or sound in the retention remaining time. In the above-mentioned second embodiment, the viewable period information is superimposed on the normal reproduced content by the information multiplexing block 25, the remaining time being outputted in image and/or sound. In the above-mentioned third embodiment, the remaining time is outputted in image and/or sound on an external device via the communication block 35. In accordance with the displayed information, the audience of content, while viewing the reproduced content, can understand a remaining time up to the content viewable limit time or how long it has passed after the passing of the limit time, while viewing the reproduced content.

In response to a viewing pause command for example inputted by the user through the control input block 16/26/36, the content recording/reproducing apparatus 1 executes viewing pause processing defined otherwise (step S3).

In response to a viewing position move command (fast forward or rewind) for example inputted by the user through the control input block 16/26/36, the content recording/reproducing apparatus 1 executes viewing position move processing defined otherwise (step S4).

Subsequently, while the viewing of content goes on, viewing pause processing and viewing position move processing are executed repeatedly.

The viewing pause processing and the viewing position move processing depend on how the viewable period of content is computed. As described above, The content viewable period may be determined on the basis of a time from a time point at which the distribution of content starts or the reception or recording of content is started to a point of time at which the recording retention period allocated to that content passes or on the basis of a point of time at which the recording retention period allocated to that content passes from a period of time at which the reproduction of that content is first started. It should be noted that a specific value is given, to each piece of content, to the recording retention period. Content distributors may set to each piece of content a recording retention period in accordance with the commercial or cultural value of that content.

Figure 5:
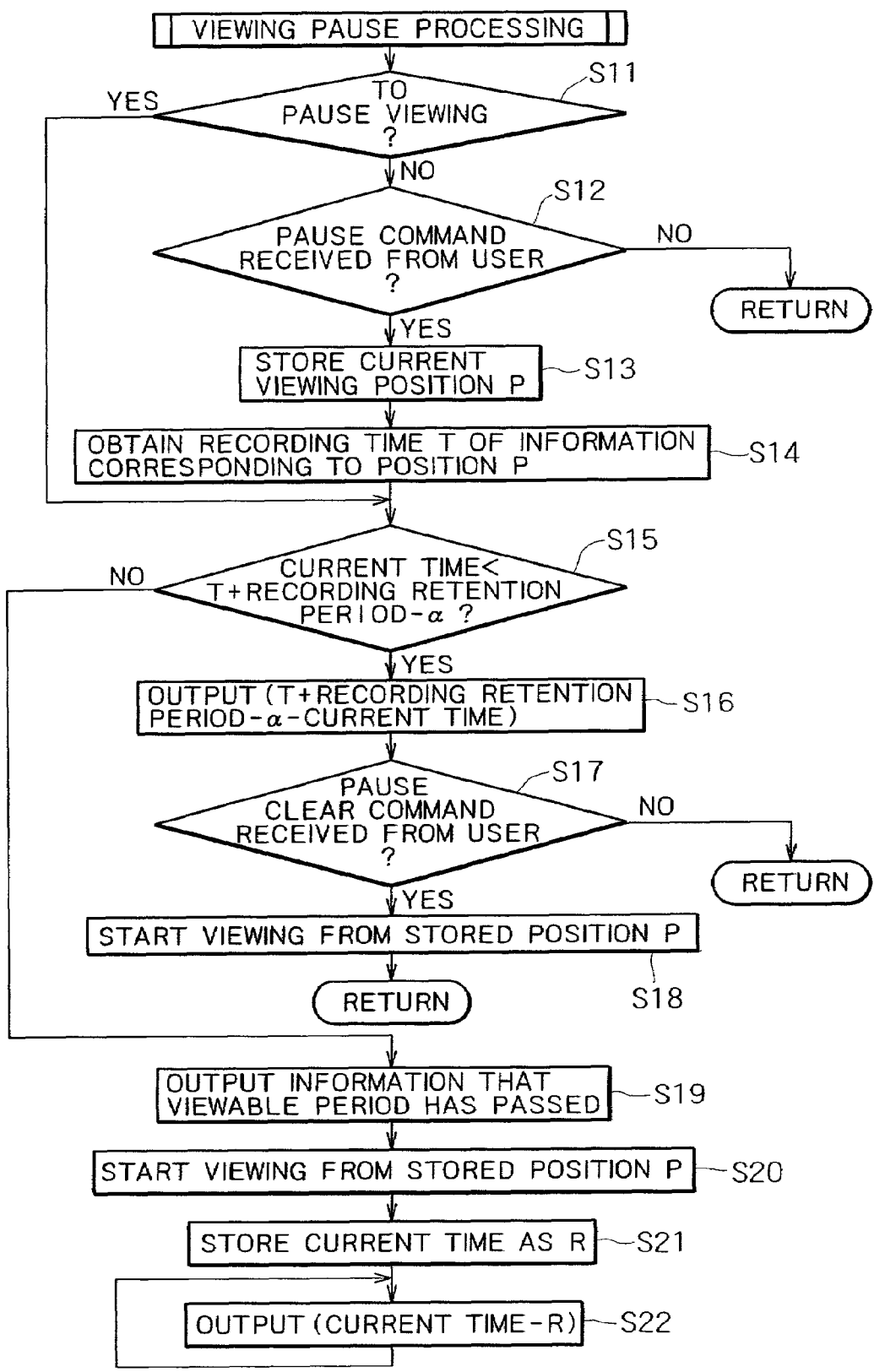
FIG. 5 is a flowchart describing in detail a procedure of viewing pause process of step S3 in the flowchart shown in FIG. 4.

Referring to FIG. 5, there is shown a detail flowchart describing a viewing pause processing procedure equivalent to step S3 in the main routine shown in FIG. 4. In this example, the viewable period of content is computed by use of the content recording time as a starting point. The following describes the viewing pause processing for recorded content with reference to the flowchart shown in FIG. 5.

During a period in which viewing is not in the pause state (step S11), it is checked whether a pause command has been received from the user through the control input block 16/26/

36 (step S12). If no pause command is found received, the procedure returns to the main routine of FIG. 4.

When a pause command is received from the user, current viewing position P in the recording/reproducing block 13/23/33 is temporarily stored (step S13), and at the same time, recording time T of the information corresponding to this viewing position P is obtained from the recording/reproduction block 13/23/33 (step S14). It is assumed here that, when recording content, the recording/reproducing block 13/23/33 obtains from the current time capture block 14/24/34 the current time at which said content is to be recorded in units of content (these units are hereafter referred to as frames) to be managed in viewable period and store beforehand the obtained current time corresponding to each content unit.

Next, it is checked whether the current time obtained from the current time capture block 14/24/34 from time to time has passed the viewable period of the content being reproduced (step S15). In this example, the viewable period is computed by use of the content recording time as a starting point. Therefore, in this decision block, a value obtained by subtracting required time α necessary for actually starting reproduction from the recording retention period allocated to the content at time T given in step S14 is compared with the current time (the current time<T+recording retention period–α), thereby determining whether the viewable period has passed or not.

If the current time has not passed the period for retaining the content being reproduced, then the information about the viewable period of the content being reproduced is outputted to notify the audience thereof (step S16). To be more specific, the information about the viewable period denotes the remaining viewable period for the recorded content being reproduced. This remaining period can be obtained by adding the recording retention period unique to the content to recording time T obtained in step S14 minus the current time minus required time α necessary for actually starting reproduction.

In step S16, in the above-mentioned first embodiment, the dedicated information display block 15 outputs to the audience the remaining viewable period of the content in the form of image and/or sound. In the above-mentioned second embodiment, the information multiplexing block 25 outputs the remaining period as superimposed on the normal reproduced content in the form of image and/or sound. In the above-mentioned third embodiment, the external device connected through the communication block 35 outputs the remaining period in the form of image and/or sound. In accordance with this displayed information, the user, namely the audience of this content, can understand a remaining time up to the content viewable limit time or how long it has passed after the expiration of the limit time, while viewing the reproduced content.

Next, it is checked whether a viewing pause clear command has been received from the user through the control input block 16/26/36 (step S17). If the viewing pause clear command has not been inputted, the procedure returns to the main routine of FIG. 4. If the viewing pause clear command has been inputted, reproduction is started from the position P previously stored in step S13 (step S18), upon which the procedure returns to the main routine.

On the other hand, if the current time has passed the viewable period of the content being reproduced, this information is outputted to notify the user thereof (step S19). In the above-mentioned first embodiment, the dedicated information display block 15 outputs the information in the form of image and/or sound indicating that the viewable period has passed. In the above-mentioned second embodiment, the information multiplexing block 25 outputs the information in the form of image and/or sound as superimposed on the normal reproduced content indicating that the viewable period has passed. In the above-mentioned third embodiment, the external device connected through the communication block 35 outputs the information in the form of image and/or sound indicating that the viewable period has passed.

Next, the reproduction of the content is started from viewing position P previously stored in step S13 (step S20). Because no explicit pause clear command has come from the user and the user is not always viewing the content, it is not always required to automatically restart the reproduction. However, so long as the viewable limit period is set, the content cannot be viewed any further due to the expiration of the viewable period, so that, regardless of whether the content is actually viewed or not, the content reproduction is automatically started in the above-mentioned embodiments.

Then, the current time at starting the reproduction is stored as R (step S21) and a value obtained by subtracting R from the current time which always progresses, namely, the elapsed time from the start of the reproduction of the recorded content in step S19, is outputted. At the same time, information indicative of the expiration of the viewable period may be outputted (step S22). In the above-mentioned first embodiment, the dedicated information display block 15 outputs this elapsed time in the form of image and/or sound. In the above-mentioned second embodiment, the information multiplexing block 25 outputs the elapsed time as superimposed on the normal reproduced content in the form of image and/or sound. In the above-mentioned third embodiment, the external device connected through the communication block 35 outputs the elapsed time in the form of image and/or sound. In accordance with this displayed information, the user, namely the audience of this content, can understand an elapsed time from the start of the reproduction of the content due to its viewable period, namely, the user can understand the time in which the user does not actually view the content (or the possibility thereof).

Figure 6:
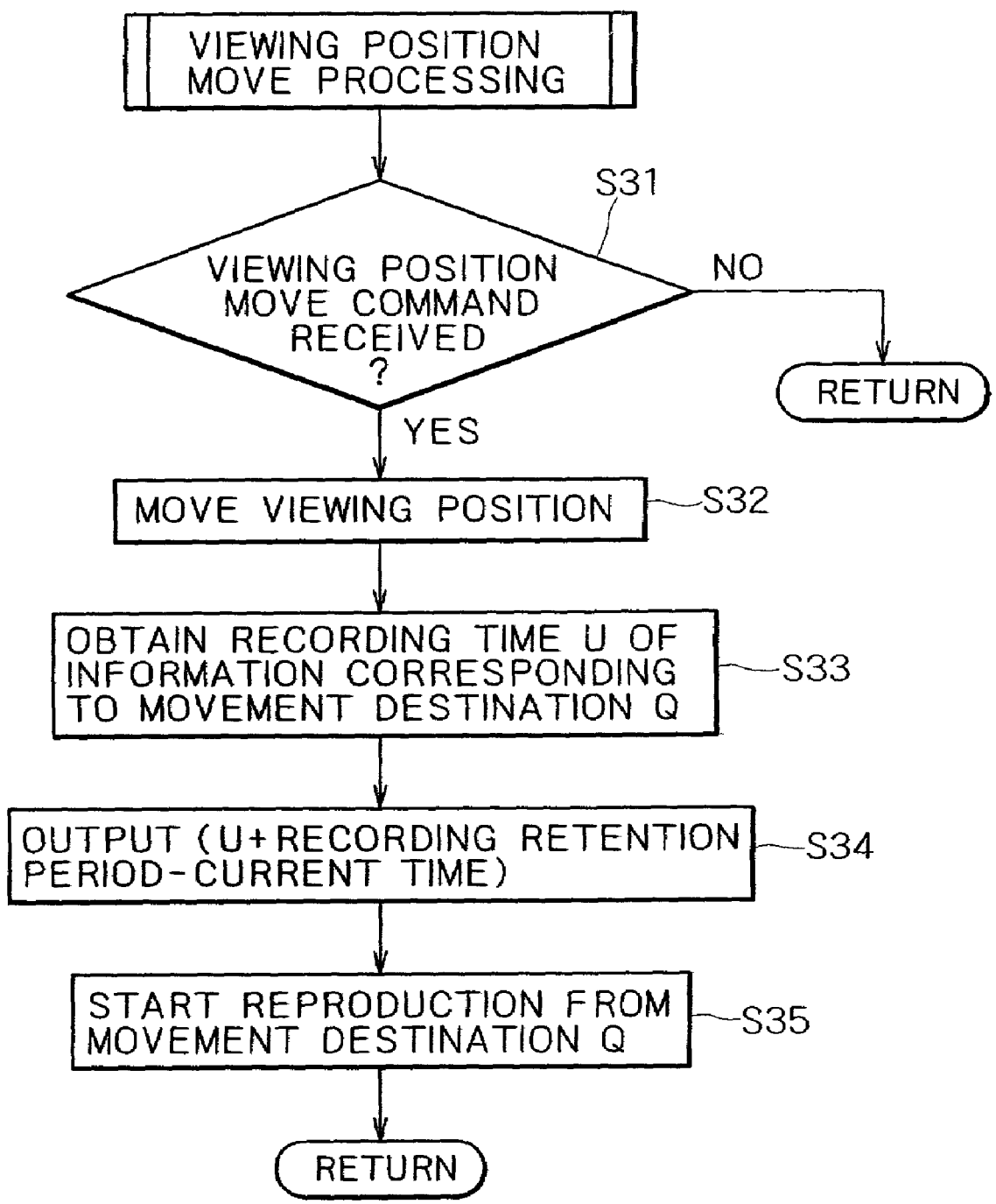
FIG. 6 is a flowchart describing in detail a procedure of viewing position move processing of step S4 in the flowchart shown in FIG. 4.

Referring to FIG. 6, there is shown a flowchart describing the viewing position move processing procedure of step S4 in the main routine of FIG. 4. In this example, the viewable period of content is computed by use of the recording time of the content as a starting point. The following describes content viewing position move processing with reference to the flowchart shown in FIG. 6.

First, it is checked whether a viewing position move command has been received from the user through the control input block 16/26/36 (step S31). The moving of viewing position as used herein is equivalent to the moving of a position at which recorded content is reproduced (for example, a position of pointer for reading information from memory) in accordance with an operation such as fast forward or rewinding or a cursor or jog dial operation in forward or backward direction.

If no viewing position move command has come from the user, the procedure returns to the main routine of FIG. 4.

On the other hand, if the viewing position move command has come from the user, the viewing position of the content being reproduced is moved accordingly (step S32).

However, the destination of the movement of the viewing position is limited to an area which is not beyond the viewable period of the recorded content. For example, if the viewable period is managed on a frame basis (or on a predetermined size basis) of content, the frames sequentially pass the viewable period in the order of their reception and recording, from earliest to latest, making the movement impossible (refer to FIG. 7).

Next, recording time U of content corresponding to movement destination Q of viewing position is obtained (step S33). Then, the relationship between the content viewable period at movement destination Q and the current time is outputted to notify the audience thereof (step S34). The relationship between the viewable period and the current time is, to be more specific, the remaining viewable period at movement destination Q. This remaining period is obtained by subtracting the current time from a value obtained by adding the recording retention period unique to content at movement destination Q to recording time U obtained in step S33.

In the above-mentioned first embodiment, the dedicated information display block 15 outputs to the audience this remaining viewable period of content in the form of image and/or sound. In the above-mentioned second embodiment, the information multiplexing block 25 outputs the remaining viewable period of content as superimposed on the normal reproduced content in the form of image and/or sound. In the above-mentioned third embodiment, the external device connected through the communication block 35 outputs the remaining viewable period of content in the form of image and/or sound. In accordance with this displayed information, the user, namely the audience of this content, can understand the remaining period up to the content viewing limit time or how long it has passed since the passing of the time limit, while viewing the reproduced image of the content.

Next, the reproduction of the content is started from this movement destination Q (step S35) and then the procedure returns to the main routine of FIG. 4.

Figure 7:
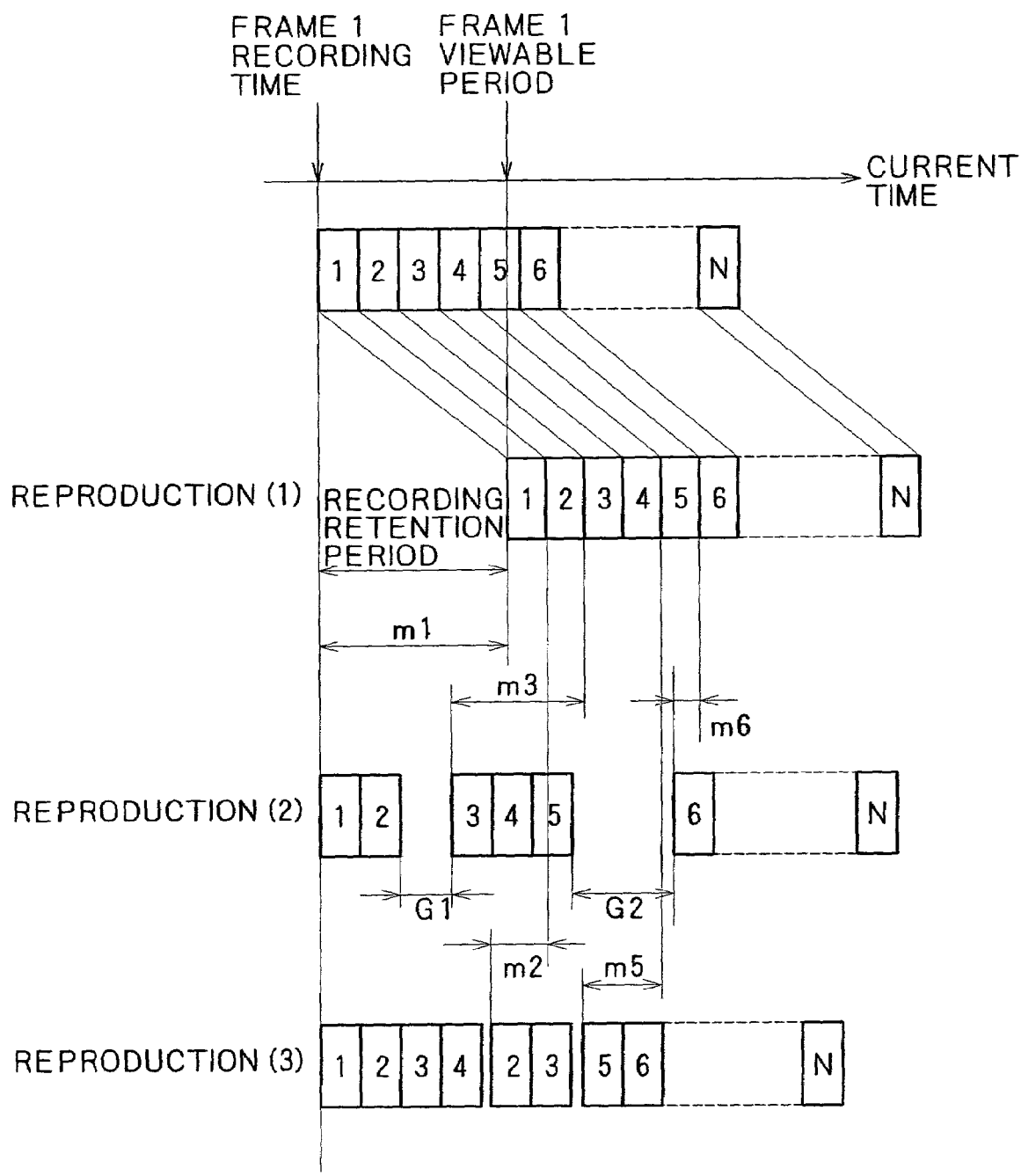
FIG. 7 is a timing chart indicative of how content received and recorded by the content recording/reproducing apparatus is reproduced (in this example, the viewable period of the content is determined on the basis of a time point at which the content is received and recorded)

Referring to FIG. 7, there is shown a timing chart indicative of the reproduction of content received and recorded in the content recording/reproducing apparatus 1.

Each content can be divided into predetermined information units such as frames. Each content is allocated with a unique recording retention period. In this example, it is assumed that, in one piece of content, all frames have a same recording retention period. The content distributor may set to each content a recording retention period in accordance with the commercial or cultural value of that content.

In the example shown in FIG. 7, the viewable period of content is computed on the basis of this recording retention period by use of the recording time of the content as a starting point. Namely, the viewable period of each frame can be obtained by subtracting the current time and required time α necessary for actually starting the reproduction from a value obtained by adding the recording retention period unique to the content to the time at which each frame is recorded.

Every frame within the viewable period can be reproduced. Because the viewable period is computed on the basis of the elapsed time from the recording or reception time, the viewable period passes sequentially from the first through the last frames, making it impossible to reproduce.

In the example shown in FIG. 7, each content consists of N frames 1 through N, which are sequentially recorded in the order of reception.

In reproduction (1), the received content is recorded in the order of its frames 1, 2, and so on, and then, in response to the expiration of the viewable period for the first frame 1, the reproduction of the received content starts from frame 1. This is equivalent to decision block S15 of the flowchart shown in FIG. 5 in which the expiration of the viewable period has been detected and step S19 and subsequent steps in which the content reproduction is automatically started.

In this case, the recording retention period of frame 1 falls in an area indicated by m1 shown in FIG. 7. If the content is reproduced immediately after its reception and recording, the remaining content viewable period at reproduction of frames 1 through N is m1.

In reproduction (2), after viewing, namely recording and immediately reproducing frame 1 and frame 2, the reproduction is paused, and then the reproduction is started from frame 3 after passing of time interval G1, and then the reproduction is paused again after reproducing up to frame 5 inclusive, and then the reproduction is started from frame 6 after passing of time interval G2.

The recording retention period of frame 1 falls in an area indicated by m1. If the content is reproduced immediately after its reception and recording, the remaining content viewable period at reproduction of frames 1 and 2 is m1.

After viewing frame 2 and after passing of time interval G1 after pausing the viewing, the viewing is restarted from frame 3. The viewable period of frame 3 at starting the viewing of frame 3 is determined by the difference between the recording retention period given to frame 3 with its recording time used as a staring point and the current time, which is equivalent to an area indicated by m3. Therefore, the remaining viewable period of the content at the reproduction of frames 3 through 5 is m3.

After viewing frame 5 and after passing of time interval G2 after pausing the viewing, the viewing is restarted from frame 6. The viewable period of frame 6 at starting the viewing of frame 6 is determined by the difference between the recording retention period given to frame 6 with its recording time used as a staring point and the current time, which is equivalent to an area indicated by m6. Therefore, the remaining viewable period of the content at the reproduction of frames 6 through N is m6.

The following relationship is established between recording retention period m1 first given to content, time intervals G1 and G2, and remaining period m6 given to frame 6.

$$G1+G2+m6=m1 \qquad \text{[Expression 1]}$$

In reproduction (3), after recording and immediately reproducing frames 1 through 4, the viewing position is moved (rewound) to frame 2 to reproduce frames 2 and 3, and then the viewing position is moved (fast forward) to frame 5 to reproduce frame 5 and subsequent frames.

Each recorded frame can be reproduce any time until the viewable period obtained from the recording retention period allocated to each recorded frame expires.

In the example shown in FIG. 7, frames 1 through 4 are reproduced, namely viewed immediately after their reception and recording, so that the remaining period is m1 which is equivalent to the recording retention period allocated to the content and therefore these frames can be reproduced.

In the above-mentioned example, after pausing the viewing of the content at frame 4, the content is rewound to view frames 2 and 3 again. The viewable period of frames 2 and 3 in this case is determined by the difference between the recording retention period given to frames 2 and 3 with the recording time used as a starting point and the current time, which is equivalent to an area indicated by m2. Therefore, the remaining period at the reproduction of frames 2 and 3 is m2 and these frames can be reproduced.

In the above-mentioned example, after pausing the viewing of the content at frame 3, frame 4 is skipped by fast forward to reproduce frame 5 and subsequent frames. The viewable period of frame 5 and subsequent frames in this case is determined by the difference between the recording retention period given to frame 5 with the recording time used as a starting point and the current time, which is equivalent to an area indicated by m5. Therefore, the remaining period at the reproduction of frame 5 and subsequent frames is m5 and these frames can be reproduced.

In the examples shown in FIGS. 5 and 6, the viewable period is computed by use of the recording time of content. For example, there is no problem if the reproduction of content is started immediately after its reception and recording. However, if the user wants to store the received content on the hard disk for example for later viewing, the viewable period of the recorded content may pass before viewing, disabling the user to view the content. On the other hand, if no viewing limit time is set, the content may be used unconditionally, thereby exposing it to the violation of its copyright for example.

Consequently, if content is not reproduced immediately after its reception, the remaining period may be computed on the basis of a time until the recording retention period allocated to the content passes from a point of time at which the reproduction of the content is first started.

Figure 8:
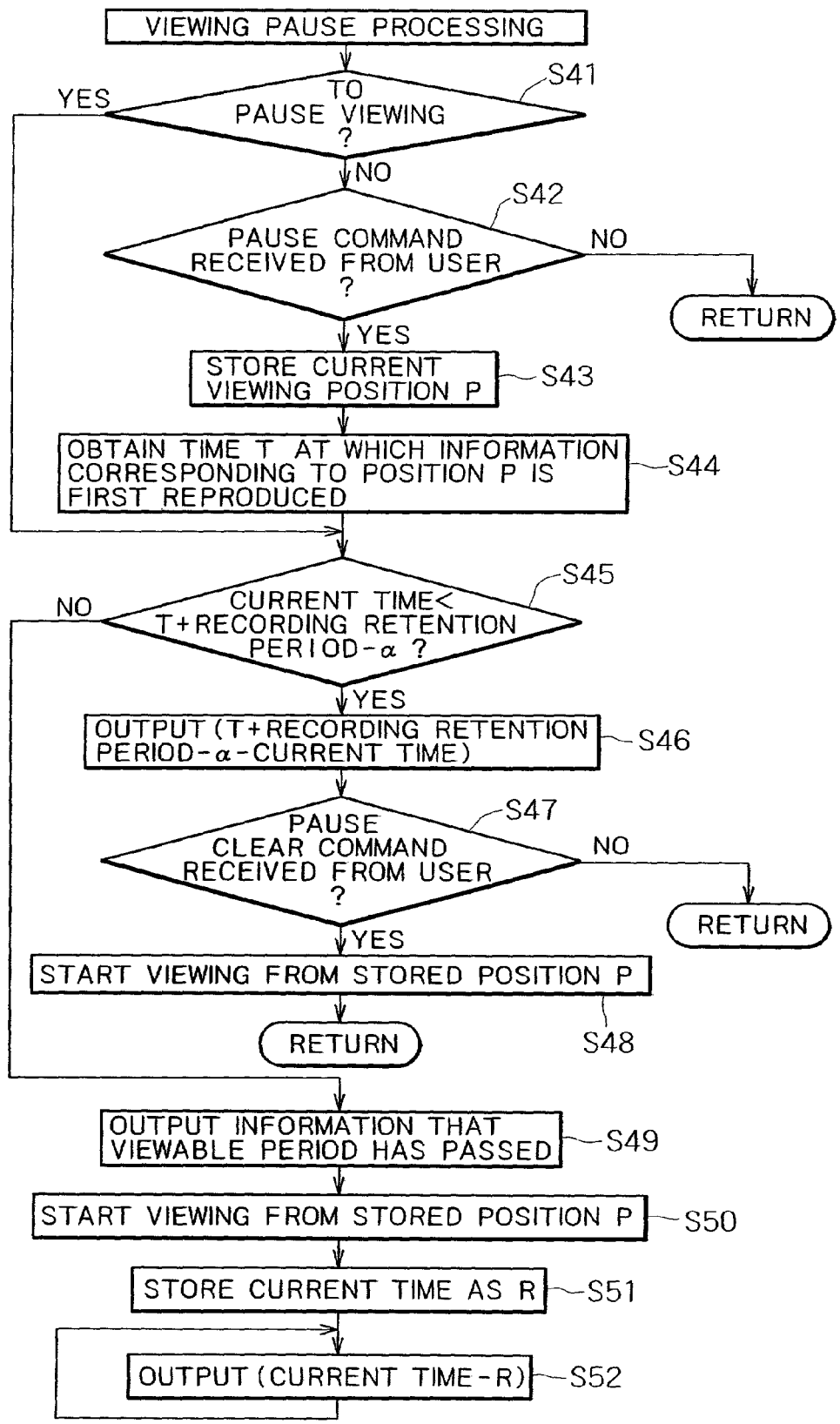
FIG. 8 is a flowchart describing in detail a variation of viewing pause processing shown in FIG. 5.

Referring to FIG. 8, there is shown in detail a flowchart describing a variation of the viewing pause processing procedure shown in FIG. 5. In this example, the viewable period of content is computed by use of, as a starting point, a time at which the content is first reproduced. The following describes the viewing pause processing for recorded content with reference to the flowchart shown in FIG. 8.

During a period in which viewing is not in the pause state (judged in step S41), it is checked whether a pause command has been received from the user through the control input block 16/26/36 (step S42). If no pause command is found received, the procedure returns to the main routine of FIG. 4.

When a pause command is received from the user, current viewing position P in the recording/reproducing block 13/23/33 is temporarily stored (step S43), and at the same time, time T at which position P of the content was first reproduced is obtained from the recording/reproducing block 13/23/33. It is assumed here that, when reproducing the content, the recording/reproducing block 13/23/33 obtains from the current time capture block 14/24/34 the current time at which said content is to be recorded in units of content (these units are hereafter referred to as frames) to be managed in viewable period and store beforehand the obtained current time corresponding to each content unit. Time T in the case where the content has not been reproduced since its recording may be either specified for each content by the copyright holder of the content or set to a certain value (step S44).

Next, it is checked whether the current time obtained from the current time capture block 14/24/34 from time to time has passed the viewable period of the content being reproduced (step S45). In this example, the viewable period is computed by use of the first reproduction of the content as a starting point. Therefore, in this decision block, a value obtained by subtracting required time α necessary for actually starting reproduction from a value obtained by adding the recording retention period allocated to the content to reproduction start time T given in step S44 is compared with the current time (the current time<T+recording retention period−α), thereby determining whether the viewable period has passed or not.

If the current time has not passed the period for retaining the content being reproduced, then the information about the viewable period of the content being reproduced is outputted to notify the audience thereof (step S46) To be more specific, the information about the viewable period denotes the remaining viewable period for the recorded content being reproduced. This remaining period can be obtained by adding the recording retention period unique to the content to recording time T obtained in step S44 minus the current time minus required time α necessary for actually starting reproduction.

In step S46, in the above-mentioned first embodiment, the dedicated information display block 15 outputs to the audience this remaining viewable period of content in the form of image and/or sound In the above-mentioned second embodiment, the information multiplexing block 25 outputs the remaining viewable period of content as superimposed on the normal reproduced content in the form of image and/or sound. In the above-mentioned third embodiment, the external device connected through the communication block 35 outputs the remaining viewable period of content in the form of image and/or sound. In accordance with this displayed information, the user, namely the audience of this content, can understand the remaining period up to the content viewing limit time or how long it has passed since the passing of the time limit, while viewing the reproduced image of the content.

Next, it is checked whether a viewing pause clear command has been received from the user through the control input block 16/26/36 (step S47). If the viewing pause clear command has not been inputted, the procedure returns to the main routine of FIG. 4. If the viewing pause clear command has been inputted, reproduction is started from the position P previously stored in step S43 (step S48), upon which the procedure returns to the main routine.

On the other hand, if the current time has passed the viewable period of the content being reproduced in step S45, this information is outputted to notify the user thereof (step S49). In the above-mentioned first embodiment, the dedicated information display block 15 outputs the information in the form of image and/or sound indicating that the viewable period has passed. In the above-mentioned second embodiment, the information multiplexing block outputs the information in the form of image and/or sound as superimposed on the normal reproduced content indicating that the viewable period has passed. In the above-mentioned third embodiment, the external device connected through the communication block 35 outputs the information in the form of image and/or sound indicating that the viewable period has passed.

Next, the reproduction of the content is started from viewing position P previously stored in step S43 (step S50). Although no explicit pause clear command has come from the user, the content cannot be viewed any further due to its viewable period, so that content reproduction is automatically started regardless of whether the content is actually viewed or not.

Then, the current time at starting the reproduction is stored as R (step S51) and a value obtained by subtracting R from the current time which always progresses, namely, the elapsed time from the start of the reproduction of the recorded content in step S49, is outputted. At the same time, information indicative of the expiration of the viewable period may be outputted (step S52). In the above-mentioned first embodiment, the dedicated information display block 15 outputs this elapsed time in the form of image and/or sound. In the above-mentioned second embodiment, the information multiplexing block 25 outputs the elapsed time as superimposed on the normal reproduced content in the form of image and/or sound. In the above-mentioned third embodiment, the external device connected through the communication block 35 outputs the elapsed time in the form of image and/or sound. In accordance with this displayed information, the user, namely the audience of this content, can understand an elapsed time from the start of the reproduction of the content due to its viewable period, namely, the user can understand the time in which the user does not actually view the content (or the possibility thereof).

Figure 9:
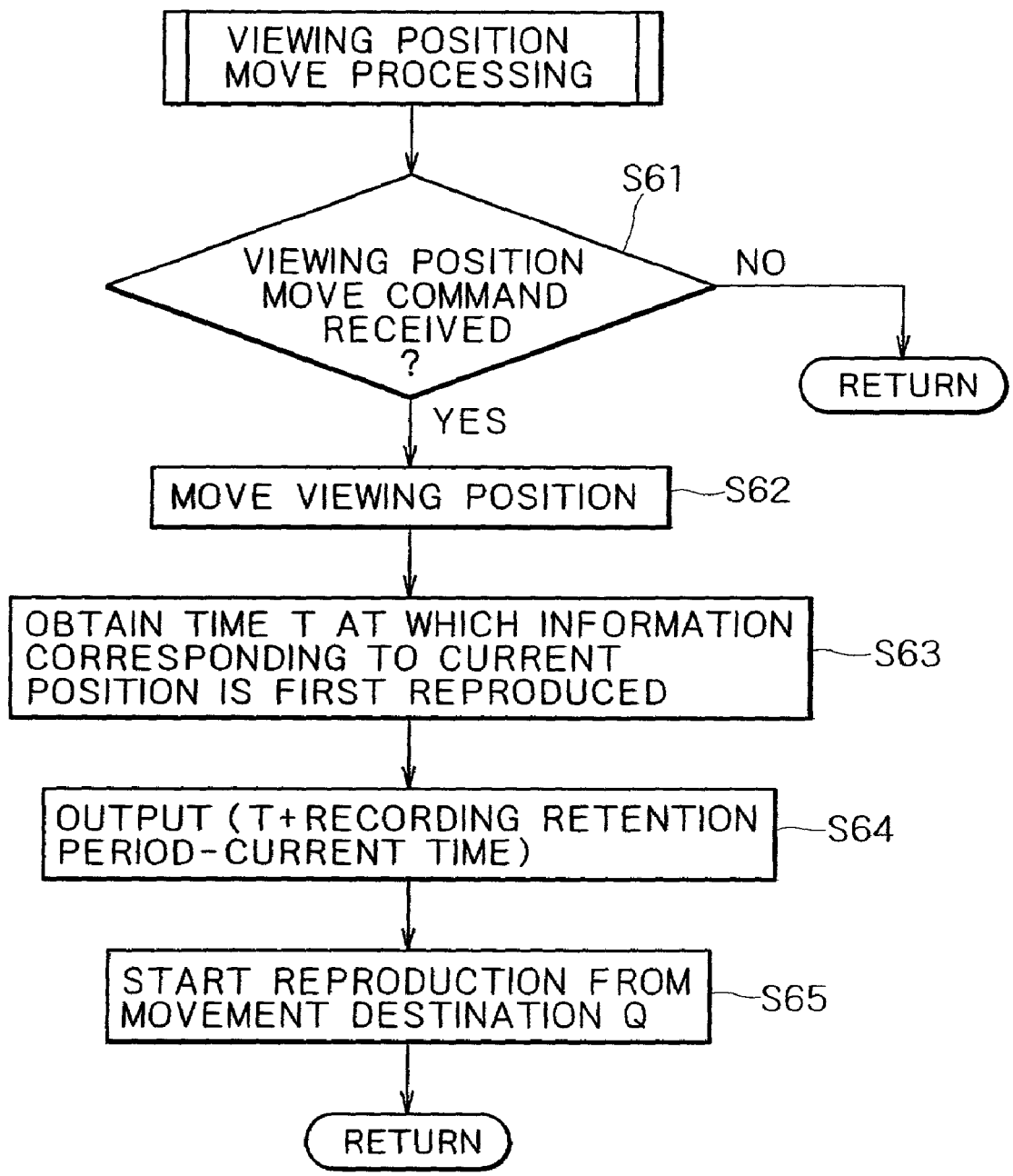
FIG. 9 is a flowchart describing in detail a variation of viewing position move processing shown in FIG. 6.

Referring to FIG. 9, there is shown a flowchart describing a viewing position move processing procedure for computing a viewable period of content as a starting point when reproducing the content for the first time. In this example, the viewable period of content is computed as a starting point when reproducing the content for the first time. The following describes content viewing position move processing with reference to the flowchart shown in FIG. 9.

First, it is checked whether a viewing position move command has been received from the user through the control input block 16/26/36 (step S61). The moving of viewing position as used herein is equivalent to the moving of a position at which recorded content is reproduced in accordance with an operation such as fast forward or rewinding or a cursor or jog dial operation in forward or backward direction.

If no viewing position move command has come from the user, the procedure returns to the main routine of FIG. 4.

On the other hand, if the viewing position move command has come from the user, the viewing position of the content being reproduced is moved to Q accordingly (step S62).

However, the destination of the movement Q of the viewing position is limited to an area which is not beyond the viewable period of the recorded content. For example, if the viewable period is managed on a frame basis (or on a predetermined size basis) of content, the frames sequentially pass the viewable period in the order of their reception and recording, from earliest to latest, making the movement impossible (refer to FIG. 10).

Next, time T at which the current position of the content was reproduced for the first time is obtained (step S63). Then, the relationship between the content viewable period at movement destination Q and the current time is outputted to notify the audience thereof (step S64). The relationship between the viewable period and the current time is, to be more specific, the remaining viewable period at movement destination Q. This remaining period is obtained by subtracting the current time from a value obtained by adding the recording retention period unique to content at movement destination Q to reproduction start time T obtained in step S63.

In the above-mentioned first embodiment, the dedicated information display block 15 outputs to the audience this remaining viewable period of content in the form of image and/or sound. In the above-mentioned second embodiment, the information multiplexing block 25 outputs the remaining viewable period of content as superimposed on the normal reproduced content in the form of image and/or sound. In the above-mentioned third embodiment, the external device connected through the communication block 35 outputs the remaining viewable period of content in the form of image and/or sound. In accordance with this displayed information, the user, namely the audience of this content, can understand the remaining period up to the content viewing limit time or how long it has passed until the expiration of the time limit, while viewing the reproduced image of the content.

Next, the reproduction of the content is started from this movement destination Q (step S65) and then the procedure returns to the main routine of FIG. 4.

Figure 10:
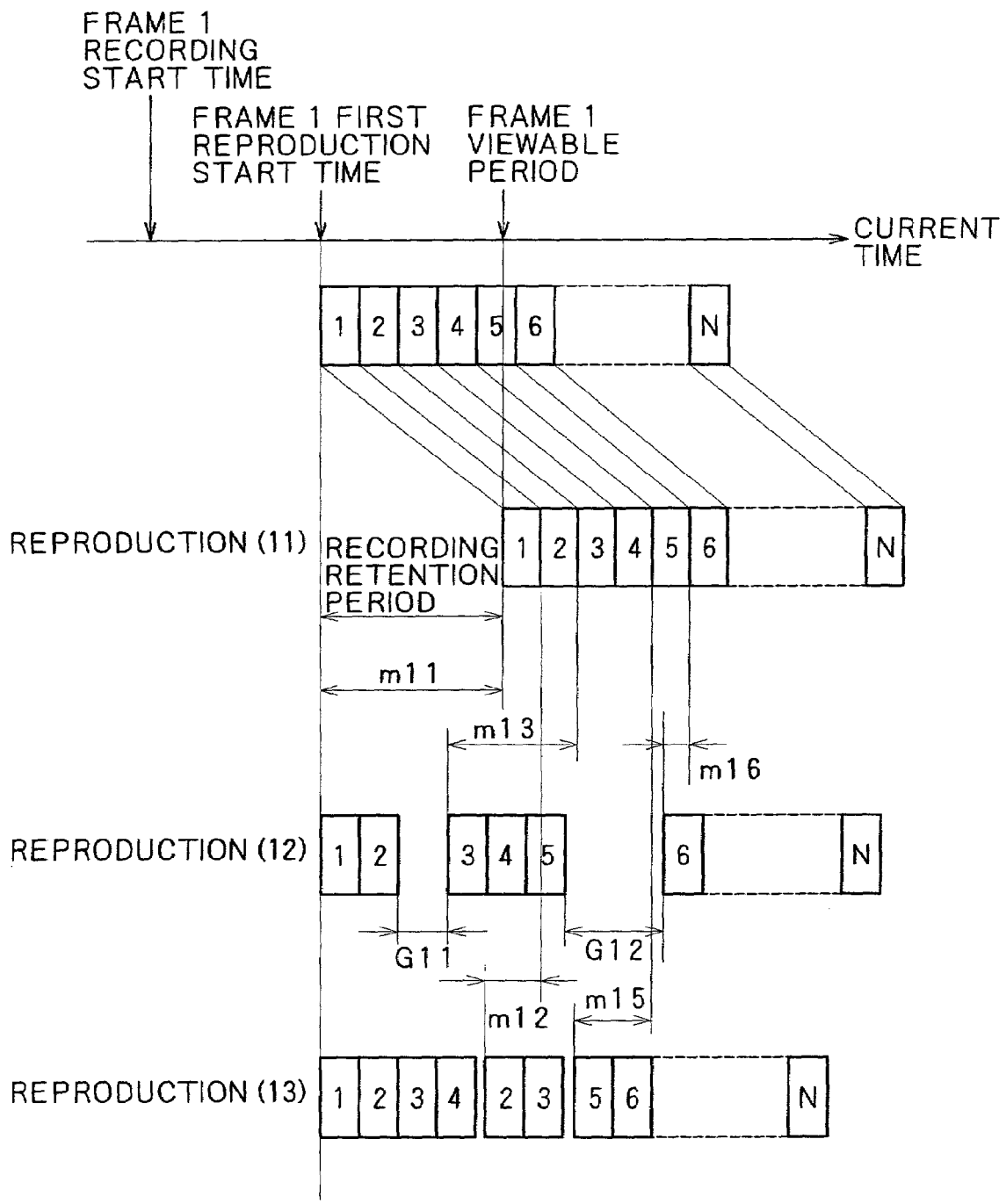
FIG. 10 is a timing chart indicative of how content received and recorded by the content recording/reproducing apparatus is reproduced (in this example, the viewable period of the content is determined on the basis of a point of time at which the content is first reproduced).

Referring to FIG. 10, there is shown a timing chart indicative of the reproduction of content received and recorded in the content recording/reproducing apparatus 1, showing the case that the viewable period of content is computed on the basis of the recording retention period of the content by use of a time at which the content is first reproduced as a starting time.

Each content can be divided into predetermined information units such as frames. Each content is allocated with a unique recording retention period In this example, it is assumed that, in one piece of content, all frames have the same recording retention period as described with reference to FIG. 7.

In the case where the viewable period of content is computed by use of the content's first reproduction time as a starting point, the viewable period of each frame can be obtained by adding the recording retention period unique to the content to a time at which each frame is first reproduced minus the current time minus required time $\alpha$ necessary for actually starting reproduction.

Every frame within the viewable period can be reproduced. The viewable period is computed on the basis of a time at which content is first reproduced. The viewable period expires sequentially from the first through the last frame, making it impossible to reproduce.

In the example shown in FIG. 10, each content consists of N frames 1 through N, which are sequentially recorded in the order of reception.

In reproduction (11), received content is recorded in the order of frames 1, 2, and so on, and then, in response to the expiration of the first frame 1 after the reproduction of the content for the first time, the reproduction of the content starts from frame 1. This is equivalent to the case in which decision block S45 of the flowchart shown in FIG. 8 in which the expiration of the viewable period has been detected and steps S49 and on in which the content reproduction is automatically started.

In this case, the recording retention period of frame 1 falls in an area indicated by m11 shown in FIG. 10. If the content is reproduced immediately after its reception and recording, the remaining content viewable period at reproduction of frames 1 through N is m11.

In reproduction (12), after viewing, namely immediately reproducing frame 1 and frame 2, the reproduction is paused, and then the reproduction is started from frame 3 after passing of time interval G11, and then the reproduction is paused again after reproducing up to frame 5 inclusive, and then the reproduction is started from frame 6 after passing of time interval G12.

The recording retention period of frame 1 falls in an area indicated by m11. Therefore, the remaining content viewable period at reproduction of frames 1 and 2 for which reproduction started for the first time is m11.

After viewing frame 2 and after passing of time interval G11 after pausing the viewing, the viewing is restarted from frame 3. The viewable period of frame 3 at starting the viewing of frame 3 is determined by the difference between the recording retention period given to frame 3 with its content first reproducing time used as a staring point and the current time, which is equivalent to an area indicated by m13. Therefore, the remaining viewable period of the content at the reproduction of frames 3 through 5 is m13.

After viewing frame 5 and after passing of time interval G12 after pausing the viewing, the viewing is restarted from frame 6. The viewable period of frame 6 at starting the viewing of frame 6 is determined by the difference between the recording retention period given to frame 6 with its content first reproducing time used as a staring point and the current time, which is equivalent to an area indicated by m16. Therefore, the remaining viewable period of the content at the reproduction of frames 6 through N is m16.

The following relationship is established between recording retention period m11 first given to content, time intervals G11 and G12, and remaining period m16 given to frame 6.

$$G11+G12+m16=m11 \qquad \text{[Expression 2]}$$

In reproduction (13), after recording and immediately reproducing frames 1 through 4, the viewing position is returned (rewound) to frame 2 to reproduce frames 2 and 3, and then the viewing position is moved (fast forward) to frame 5 to reproduce frames 5 and subsequent frames.

Each recorded frame can be reproduced at any time until the viewable period obtained from the recording retention period allocated to each recorded frame expires.

In the example shown in FIG. 10, the viewable period for frames 1 through 4 is m11 which is equivalent to the recording retention period uniquely allocated to the content.

In the above-mentioned example, after pausing the viewing of the content at frame 4, the content is rewound to view frames 2 and 3 again. The viewable period of frames 2 and 3 in this case is determined by the difference between the recording retention period given to frames 2 and 3 with the first reproducing time used as a starting point and the current time, which is equivalent to an area indicated by m12. Therefore, the remaining period at the reproduction of frames 2 and 3 is m12 and these frames can be reproduced.

In the above-mentioned example, after pausing the viewing of the content at frame 3, frame 4 is skipped by fast forward to reproduce frames 5 and subsequent frames. The viewable period of frames 5 and subsequent frames in this case is determined by the difference between the recording retention period given to frame 5 with the recording time used as a starting point and the current time, which is equivalent to an area indicated by m15. Therefore, the remaining period at the reproduction of frames 5 and subsequent frames is m15 and these frames can be reproduced.

While the preferred embodiments of the present invention have been described using specific terms, such description is for illustrative purposes only, and it is to be understood that changes and variations may be made without departing from the spirit or scope of the appended claims.

What is claimed is:

1. A content recording/reproducing apparatus for controlling the recording and reproducing of content limited in viewable period, comprising:
   content recording means for recording content;
   determination means for determining a viewable period of the recorded content;
   presentation means for presenting information associated with said viewable period of said recorded content;
   content reproduction means for reproducing said recorded content; and
   reproduction control means for controlling a reproducing operation of said content reproduction means in accordance with said viewable period of said recorded content,
   wherein the recorded content includes a plurality of frames and each frame has a corresponding viewable period that is obtained by subtracting a first value, corresponding to the combination of a current time and a time needed for starting reproduction, from a second value, corresponding to the combination of the viewable period and a recording time of the frame.

2. The content recording/reproducing apparatus according to claim 1, wherein said determination means determines said viewable period of content on the basis of a recording retention period unique to each content.

3. The content recording/reproducing apparatus according to claim 2, wherein said determination means determines said viewable period of content on the basis of a period of time from at least one of a point of time at which the distribution of said content is started and a point of time at which at least one of the reception and recording of said content is started by said content recording means to a point of time at which said recording retention period given to said content passes.

4. The content recording/reproducing apparatus according to claim 2, wherein said determination means determines said viewable period of content on the basis of a period of time from a point of time at which the reproduction of said content is first started by said content reproduction means to a point of time at which said recording retention period given to said content passes.

5. The content recording/reproducing apparatus according to claim 1, wherein said presentation means presents said information associated with said viewable period of said recorded content by superimposing said information on a reproduction signal of said content generated by said content reproduction means.

6. The content recording/reproducing apparatus according to claim 1, wherein said presentation means presents said information associated with said viewable period of said recorded content through an output device different from a reproduction output device of said content.

7. The content recording/reproducing apparatus according to claim 1, wherein said presentation means transmits said information associated with said viewable period of said recorded content to a predetermined communication path.

8. The content recording/reproducing apparatus according to claim 1, wherein said reproduction control means prohibits the reproduction of the content of which viewable period has passed, by said content reproduction means.

9. The content recording/reproducing apparatus according to claim 1, further comprising:
   control input means for accepting user command input;
   wherein, in response to an instruction for moving a content viewing start position through said control input means, said reproduction control means instructs said content reproduction means to move a content viewing position and said presentation means presents information associated with the viewable period of the reproduced content.

10. The content recording/reproducing apparatus according to claim 1, further comprising:
    control input means for accepting user command input;
    wherein, in response to an instruction for clearing a viewing pause operation through said control input means, said presentation means presents said information associated with said viewable period of said content, and if said viewable period of said content has not been passed, said reproduction control means instructs said content reproduction means to start reproducing said content.

11. The content recording/reproducing apparatus according to claim 1, wherein, in response to the expiration of said viewable period of content in a viewing paused state, said reproduction control means starts reproducing said content in the viewing paused state regardless of a user instruction for clearing said viewing paused state.

12. The content recording/reproducing apparatus according to claim 1, wherein, in response to the expiration of said viewable period of content in a viewing paused state, said reproduction control means starts reproducing said content in the viewing paused state regardless of a user instruction for clearing said viewing paused state and
    said presentation means presents an elapsed time from the start of the reproduction of said content and/or information indicative of the expiration of said viewable period.

13. A computer-implemented content recording/reproducing method for controlling the recording and reproduction of content limited in viewable period, the computer including a processor and memory and the method comprising the steps performed by the computer of:

recording by the processor content;

determining by the processor a viewable period of the recorded content;

presenting by the processor information associated with said viewable period of said recorded content; and reproducing by the processor said recorded content in accordance with a relationship between a recording retention period of said recorded content and a current time, wherein the recorded content includes a plurality of frames and each frame has a corresponding viewable period that is obtained by subtracting a first value, corresponding to the combination of a current time and a time needed for starting reproduction, from a second value, corresponding to the combination of the viewable period and a recording time of the frame.

14. The content recording/reproducing method according to claim 13, wherein, in said determination step, said viewable period of content is determined on the basis of a recording retention period unique to each content.

15. The content recording/reproducing method according to claim 14, wherein, in said determination step, said viewable period of content is determined on the basis of a period of time from at least one of a point of time at which the distribution of said content is started and a point of time at which at least one of the reception and recording of said content is started in said content recording step to a point of time at which said recording retention period given to said content passes.

16. The content recording/reproducing method according to claim 14, wherein, in said determination step, said viewable period of content is determined on the basis of a period of time from a point of time at which the reproduction of said content is first started in said content reproduction step to a point of time at which said recording retention period given to said content passes.

17. The content recording/reproducing method according to claim 13, wherein, in said presentation step, said information associated with said viewable period of said recorded content is presented by superimposing said information on a reproduction signal of said content.

18. The content recording/reproducing method according to claim 13, wherein, in said presentation step, said information associated with said viewable period of said recorded content is presented through an output device different from a reproduction output device of said content.

19. The content recording/reproducing method according to claim 13, wherein, in said presentation step, said information associated with said viewable period of said recorded content is transmitted to a predetermined communication path.

20. The content recording/reproducing method according to claim 13, wherein, in said reproduction control step, the reproduction of the content of which viewable period has passed is prohibited.

21. The content recording/reproducing method according to claim 13, wherein, in response to an instruction for moving a content viewing start position from a user, a content viewing position is moved in said content reproduction step, and information associated with the viewable period of the reproduced content is presented in said presentation step.

22. The content recording/reproducing method according to claim 13, wherein, in response to an instruction for clearing a viewing pause operation from a user, said information associated with said viewable period of said content is presented in said presentation step, and if said viewable period of said content has not been passed, said content is reproduced in said content reproduction step.

23. The content recording/reproducing method according to claim 13, wherein, in response to the expiration of said viewable period of content in a viewing paused state, the reproduction of said content in the viewing paused state is started in said content reproduction step regardless of a user instruction for clearing said viewing paused state.

24. The content recording/reproducing method according to claim 13, wherein, in response to the expiration of said viewable period of content in a viewing paused state, the reproduction of said content in the viewing paused state is started in said content reproduction step regardless of a user instruction for clearing said viewing paused state and an elapsed time from the start of the reproduction of said content and/or information indicative of the expiration of said viewable period is presented in said presentation step.

25. A storage medium physically storing computer software in a computer-readable format, said computer software being written so as to execute, on a computer system, control of recording and reproducing operations of content limited in viewable period, said computer software comprising the steps of:

recording content;

determining a viewable period of the recorded content;

presenting information associated with said viewable period of said recorded content; and reproducing said recorded content in accordance with a relationship between a recording retention period of said recorded content and a current time, wherein the recorded content includes a plurality of frames and each frame has a corresponding viewable period that is obtained by subtracting a first value, corresponding to the combination of a current time and a time needed for starting reproduction, from a second value, corresponding to the combination of the viewable period and a recording time of the frame.

* * * * *

UNITED STATES PATENT AND TRADEMARK OFFICE
CERTIFICATE OF CORRECTION

| | |
|---|---|
| PATENT NO. | : 7,609,936 B2 |
| APPLICATION NO. | : 10/062991 |
| DATED | : October 27, 2009 |
| INVENTOR(S) | : Takehiko Nakano |

It is certified that error appears in the above-identified patent and that said Letters Patent is hereby corrected as shown below:

In claim 13, column 25, line 1, "comprising the steps" should read --comprising steps--.

In claim 13, column 25, line 3, "recording by" should read --recording, by--.

In claim 13, column 25, line 4, "determining by" should read --determining, by--.

In claim 13, column 25, line 6, "presenting by" should read --presenting, by--.

In claim 13, column 25, line 8, "reproducing by" should read --reproducing, by--.

Signed and Sealed this

Twenty-sixth Day of January, 2010

David J. Kappos
*Director of the United States Patent and Trademark Office*